United States Patent [19]

Dubey

[11] 4,344,470
[45] Aug. 17, 1982

[54] DELIMBING APPARATUS

[75] Inventor: Dennis Dubey, Menominee, Mich.

[73] Assignee: Forest Country Engineering Co., Menominee, Mich.

[21] Appl. No.: 209,849

[22] Filed: Nov. 24, 1980

[51] Int. Cl.³ .............................................. A01G 23/02
[52] U.S. Cl. ...................................... 144/2 Z; 83/855
[58] Field of Search ............... 144/2 Z, 208 F; 83/855

[56] References Cited

U.S. PATENT DOCUMENTS 3,587,685  6/1971  Morey .............................. 144/208 F

FOREIGN PATENT DOCUMENTS 605712  5/1978  U.S.S.R. .............................. 144/2 Z
609622  5/1978  U.S.S.R. .............................. 144/2 Z

Primary Examiner—W. D. Bray

[57] ABSTRACT

A machine for removing limbs from trees is described and includes a frame and a pair of saws supported by the frame, the saws each having a longitudinal axis, and being supported by the frame for rotation about the longitudinal axis. The saws include a blade having a cutting edge and being wrapped around the axis in a helical pattern, and the saws are supported in parallel side-by-side relation and are adapted to engage a tree with tree disposed between the saws and with the tree being generally parallel to the longitudinal axes of the saws. The saws are adapted to be rotatably driven about their axes and toward each other. The machine also includes a pair of rollers for clampingly engaging a tree, for pulling the tree in the direction of the longitudinal axes, and for rotating the tree as it is pulled.

15 Claims, 6 Drawing Figures

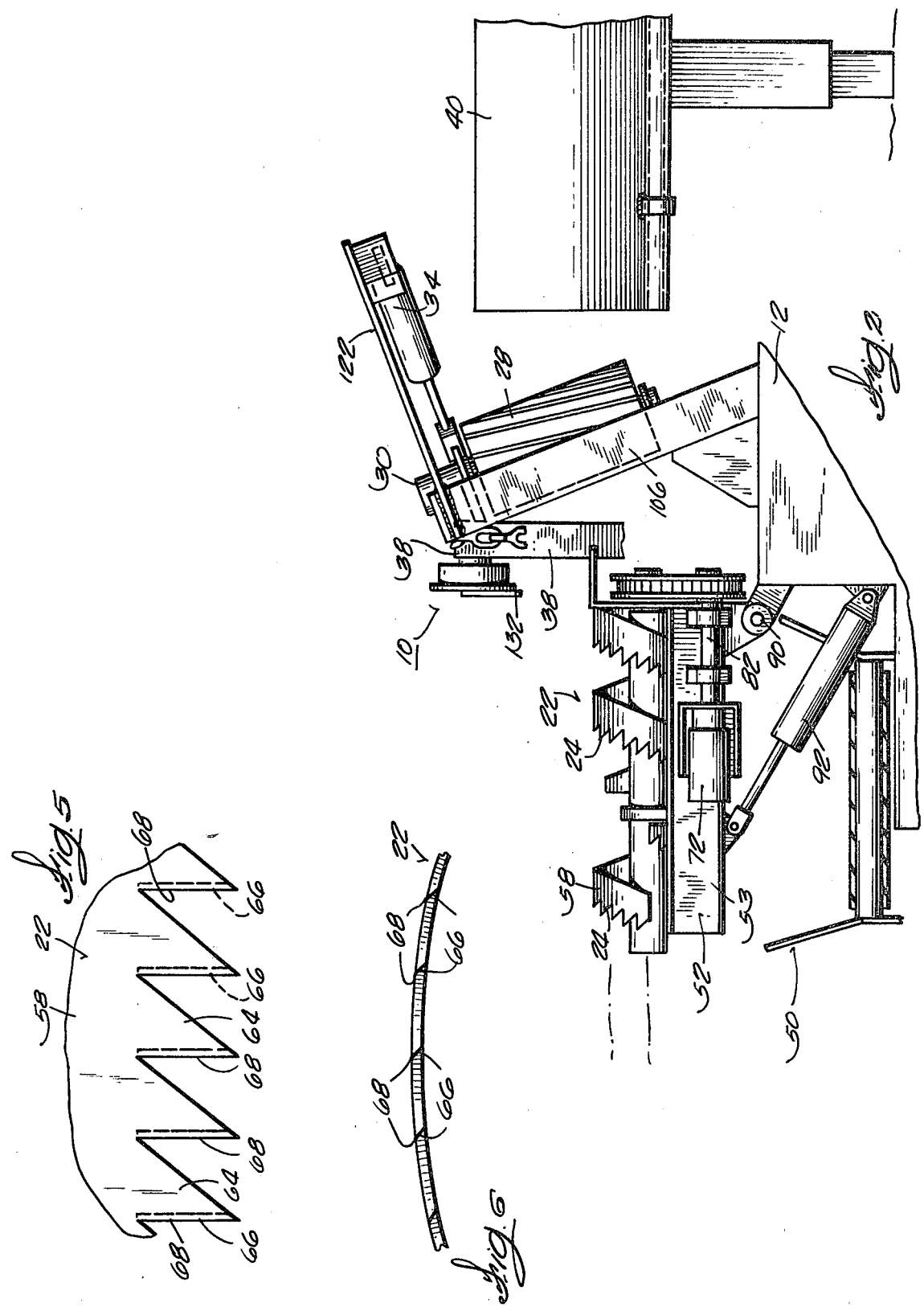

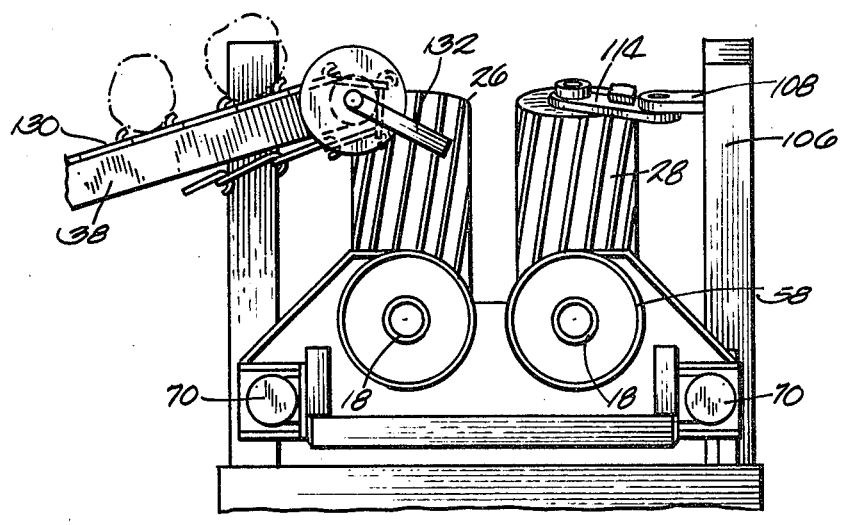
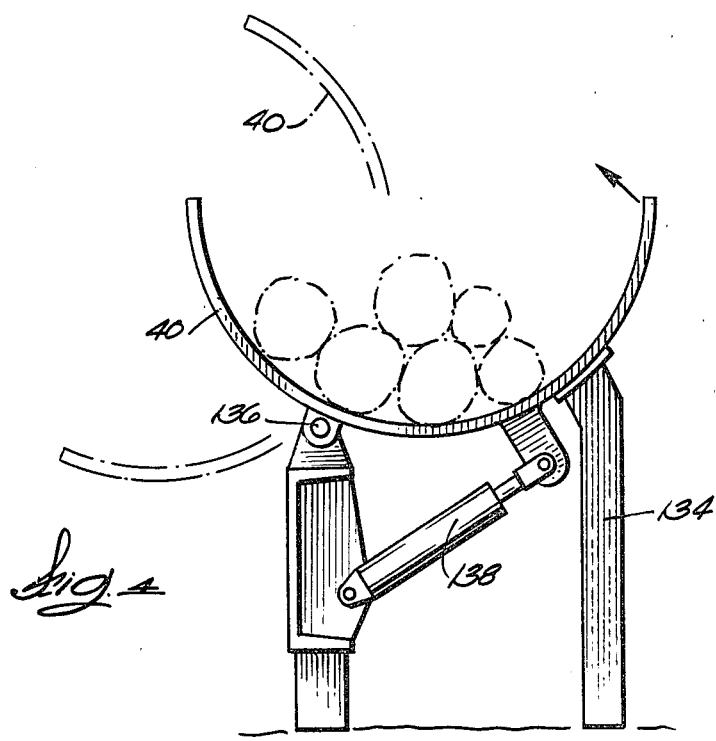

DELIMBING APPARATUS

FIELD OF THE INVENTION

The invention relates to machines for use in removing the unwanted limbs from trees during foresting, and for example those trees being harvested for use in paper making.

BACKGROUND PRIOR ART

When trees are harvested for use in pulp mills and the like, it is common practice to cut the tree down, remove the limbs from the trees, and then cut the trees into 8 ft. lengths for transport to pulp mills.

One of the common machines for removing limbs from felled trees is called a "fail delimber". When using the flail delimber, the cut trees are laid on the ground in generally parallel side-by-side relation. The flail delimber is driven over the trees in the direction of the lengths of the trees and it includes a number of heavy chains attached to a rotating shaft. When the shaft is rotatably driven, the chains rotate with the shaft at high speed. When the flail delimber is driven over the trees and along their length, the chains will strike the limbs and tear them away from the tree trunks.

One of the drawbacks of this arrangement is that limbs and branches being struck by the chains are thrown substantial distances and the logging area is left strewn with the waste forest products which are then difficult to collect or reclaim.

While in the past, little emphasis has been placed on reclaiming the waste forestry products, the increase in the costs of fuel and of wood products necessitate a more efficient means be found for reclaiming wood products. One of these needs is for an efficient, low cost means for removing limbs from trees while also permitting convenient recovery of the limbs which are cut from the trees such that this material can be used as fuel or as wood chips.

Another potential disadvantage of flail delimbers is that the branches and limbs which are thrown by the flailing chains may be dangerous to workers in the area. It is also possible for chains to break away from the driven shaft and to be thrown substantial distances.

The use of a flail delimber is also time consuming in that it requires the cut trees to be laid on the ground in parallel relation so that a flail delimber can be driven over them, and then the trees must be moved to a slashing machine where they are cut into lengths.

Referring to other types of machines for delimbing trees, attention is directed to the delimbing apparatus shown in the Neal et al. U.S. Pat. No. 3,972,357; the Mellgren U.S. Pat. No. 3,624,756; the Larson U.S. Pat. No. 4,098,311; and the Groves U.S. Pat. No. 3,633,638.

Attention is also directed to the Cote U.S. Pat. No. 3,576,203; the Zehavi et al. U.S. Pat. No. 3,724,518; and the Bronemo U.S. Pat. No. 3,385,331.

Attention is further directed to the following Russian patents which relate to various arrangements for removing limbs from trees: 0609622, dated June, 1978; 0627969, dated August, 1978; 0605713, dated May, 1978; 0596439, dated March 1978; 0605712, dated May, 1978, 0576216, dated October, 1977; and 0627968, dated August, 1978.

SUMMARY OF THE INVENTION

The present invention provides an improved machine for use in removing limbs from trees. More particularly, the invention includes a machine for removing limbs from trees and including a frame and a saw supported by the frame for rotation about a longitudinal axis, the saw including a helical blade surrounding the axis and being adapted to engage a tree with the tree being generally parallel to the longitudinal axis of the saw. The machine also includes means for causing rotation of the saw about its axis whereby the cutting edge of the helical blade will engage the limbs of the tree, and means for clampingly engaging a tree, for pulling the tree in the direction of the longitudinal axis of the saw, and for rotating the tree as it is pulled along the saw. The means for pulling and rotating includes a pair of rollers adapted to clampingly engage the tree, means for moving one of the rollers toward the other roller and into clamping engagement with the tree, and means for causing rotation of one of the rollers.

The invention also includes a machine for removing limbs from trees, the machine including a frame and a saw supported by the frame for rotation about a longitudinal axis and having a helical blade surrounding the axis, the blade being adapted to support a tree thereon with the tree being generally parallel to the longitudinal axis of the saw. The saw has a length substantially less than the length of the trees to be delimbed. The machine also includes means for causing rotation of the saw about its axis whereby the cutting edge will engage the limbs of the tree, and means for clampingly engaging a tree, for pulling the tree in the direction of the longitudinal axis over the saw, and for rotating the tree as it is pulled over the saw. The means for pulling and rotating includes a pair of rollers adapted to clampingly engage the tree, means for moving one of the rollers toward the other roller and into clamping engagement with the tree, the means for moving including a hydraulic cylinder supported by the frame and having one end connected to one of the rollers, and means for causing rotation of one of the rollers.

One of the features of the invention is the provision of a helical saw which includes teeth which extend in a direction opposite to the direction of movement of the tree over the saw, and wherein the means for rotating causes rotation of the saw in the same rotational direction as the direction of helical wrap of the blade around the longitudinal axis of the saw.

Another feature of the invention is the provision of a helical saw which includes teeth having cutting edges extending generally parallel to the longitudinal axis and wherein the teeth project in a direction opposite to the direction of movement of the tree over the saw.

The invention also includes a machine for removing limbs from trees, the machine comprising a frame and a pair of saws supported by the frame, the saws each including a longitudinal axis, and being supported by the frame for rotation about the longitudinal axis. The saws also include a blade including a cutting edge and being wrapped around the longitudinal axis in a helical pattern. The saws have a length substantially less than the length of the trees to be delimbed and are supported in parallel side-by-side relation and are adapted to support a tree thereon with the tree disposed between the saws and with the tree being generally parallel to the longitudinal axes of the saws. The machine also includes means for causing rotation of the saws about their axes and toward each other, and means for clampingly engaging a tree, for pulling the tree in the direction of the longitudinal axes over the saws, and for rotating the tree as it is pulled over the saws. The means for pulling and rotating includes a pair of rollers adapted to clampingly engage the tree, means for moving the rollers into clamping engagement with the tree, and means for causing rotation of the rollers toward each other.

One of the advantages of the delimbing machine of the invention is that as the limbs are cut off of the tree they are pulled down between the saws such that they can fall onto a conveyor mechanism where they can be reclaimed for use as fuel or the like.

Another of the advantages of the invention is that the delimber can be employed to delimb a wide variety of trees and to remove limbs even from trees which do not have straight trunks. This is an advantage over the prior art structures since many of those delimbing machines are not functional if the trees are not straight. Secondly, many prior art machines are effective only on trees having brittle limbs or only when the trees are frozen. The structure of the invention is useful in removing the limbs from trees even where those trees are of the type which have proved difficult to delimb using prior art apparatus.

Another of the advantages of the invention is that the apparatus described can be substantially less expensive to manufacture than prior art units yet provides a delimbing machine which works faster than the prior art structures and also one which produces a "cleaner" product i.e. one which is more readily adaptable to a pulp making process with the least amount of additional processing.

Additionally, the delimber described herein is safer to operate than the conventional flail delimber because it does not employ the high speed flailing chains or cause waste material such as branches or limbs to be thrown great distances as is the case with the flail delimber.

Other features and advantages of the invention are set forth in the following description, in the claims, and in the drawings.

BRIEF DESCRIPTION OF THE DRAWINGS

FIG. 2 is a side elevation view of the apparatus shown in FIG. 1 and being taken generally along line 2—2 in FIG. 1.

FIG. 3 is an end elevation view taken generally along line 3—3 in FIG. 1.

FIG. 4 is an end elevation view taken along line 4—4 in FIG. 1.

FIG. 5 is an enlarged partial plan view of one of the saws of the delimbing machine shown in FIG. 1.

FIG. 6 is an end view of the portion of the saw shown in FIG. 5.

Figure 1:
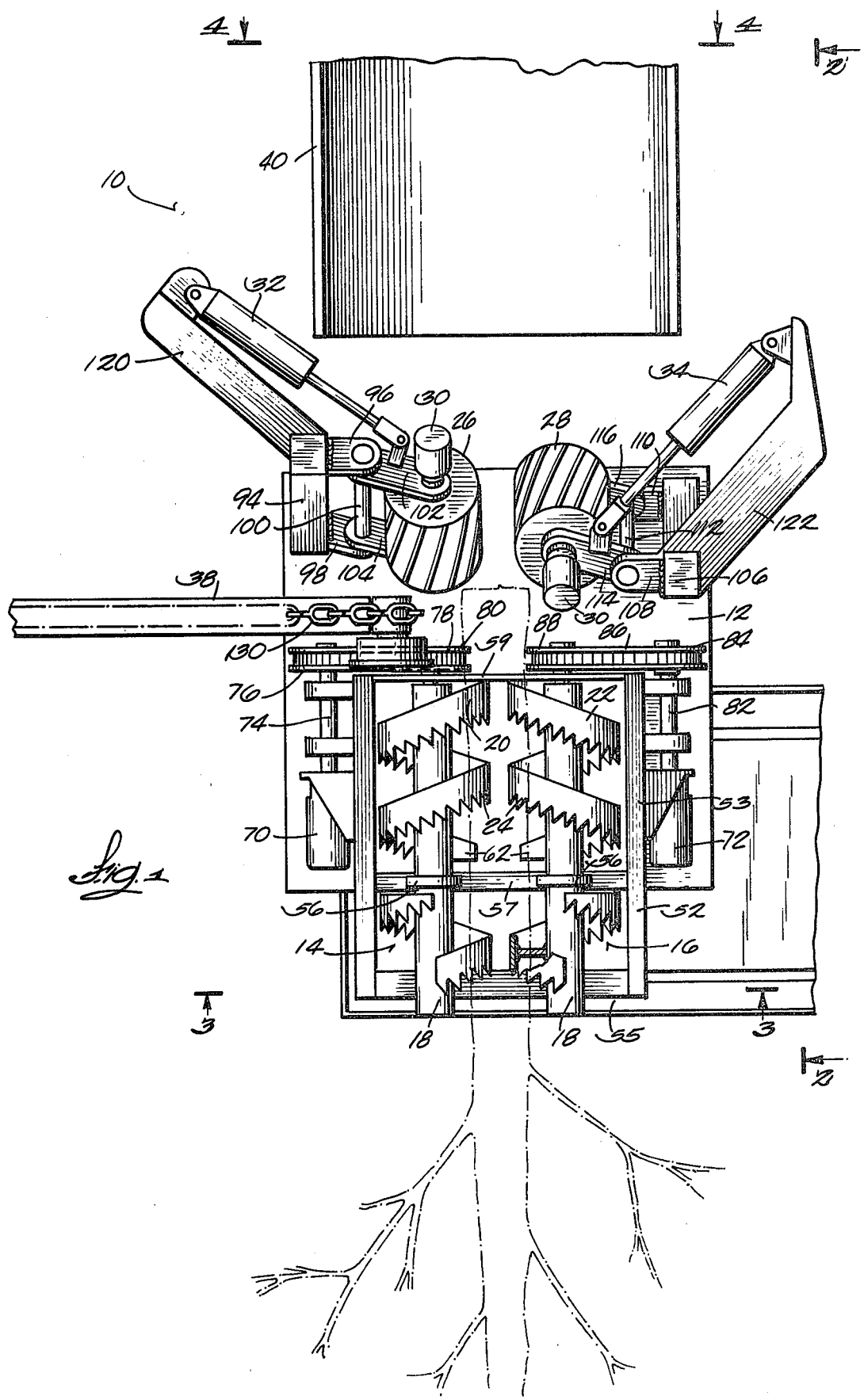
FIG. 1 is a plan view of the delimbing machine embodying the invention.

Before describing at least one embodiment of the invention, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a delimbing machine 10 embodying the present invention. The delimbing machine 10 is shown as including a stationary frame 12 adapted to be set up at a logging site. It should be understood that in other embodiments of the invention, the delimbing machine 10 could be supported on a trailer, comprise a self-propelled vehicle or be supported in some other mobile fashion so as to be easily transported from one location to another. In other embodiments, the machine could be fixed in place, for example, as part of the apparatus of a pulp mill or the like.

The frame 12 illustrated in the drawings is adapted to support a pair of rotary saws 14 and 16. The rotary saws 14 and 16 each include a central shaft or tube support 18 and a saw blade 20 and 22, respectively, which is wrapped around the central shaft 18 to form a helical configuration and supported in spaced relation from the central shaft 18, the saw blades 20 and 22 including saw teeth 24 formed in one edge of the blade. The rotary saws 14 and 16 are rotatably driven in opposite directions about the longitudinal axis of the central shafts 18 and toward each other. In operation of the saws, it is intended that a tree (shown in phantom in FIGS. 1 and 2 is to be positioned between the saws 20 and 22 and so as to be supported on the saw blades 20 and 22. As the tree is pulled over the saws, the teeth 24 of the saw blades 20 and 22 will engage the limbs of the tree and cause the limbs to be stripped from the trunk of the tree and pulled downwardly between the two rotating saws 14 and 16. In the illustrated embodiment, the delimbing apparatus also includes a pair of rollers 26 and 28 which are adapted to clampingly engage the trunk of the tree so as to pull the tree in a direction parallel to the longitudinal axis of the two saws 14 and 16 while also rotating the tree. The rollers 26 and 28 are rotatably driven by hydraulic motors 30 and can be forced into clamping engagement with the tree trunk by the hydraulic cylinders 32 and 34, respectively.

Means are further provided for feeding successive trees to the rotary saws. In the illustrated construction this means comprises a chain conveyor 38, and trees are intended to be placed on the chain conveyor and fed to a position where the butt end of successive trees can be clampingly engaged by the rollers 26 and 28 and the trees will be positioned on the two rotating saws 14 and 16. In other embodiments of the invention, the illustrated conveyor type feeding means could be replaced by a boom and grapple or by some other conventional log handling apparatus.

The delimbing machine 10 also includes an elongated, concave bin 40 (partially shown) adapted to receive the logs which have been delimbed. The logs are fed by the rollers 26 and 28 into the concave bin 40, and the concave bin is supported in such a manner that when a number of logs have been received in the bin, the bin can be tipped to the position shown in phantom in FIG. 4 whereupon the logs are dumped to a secondary receiving station for removal to a slasher.

The delimbing machine 10 also includes a conveyor assembly 50 adapted to receive the limbs and other material cut off the trees by the rotary saws 14 and 16 and to convey these waste products to a grinder or other apparatus for recovering these materials for use as fuel or the like.

Referring more particularly to the rotary saws 14 and 16, the central shafts 18 are supported at their opposite ends by a rectangular sub-frame 52 in such a manner that they are freely rotatable about their longitudinal axes. The sub-frame 52 includes a pair of lateral beams 53 joined by transverse cross members 55, 57 and 59.

The means for supporting the central shafts 18 includes bearings 56 supported by the transverse member 57 of sub-frame 52. Each of the helical blades 20 and 22 comprises a saw blade including a radially outer surface 58 (FIGS. 2 and 5) and a complementary radially inner surface 60. The blades are supported in spaced relation from the central shaft 18 by a plurality of spacers 62 which are welded to the inner surface 60 of the blades and to the outer surface of the central shafts 18. The helical blades 20 and 22 also include saw teeth 24 which are cut in the forward edge of the saw blade, i.e. that edge of the blade which is opposite to the direction of travel of a tree which is being delimbed. The saw teeth 24 each include a cutting surface 66 (FIG. 5) which is adapted to engage the tree limb as the rotary saw is rotated and to pull that limb toward a position between the two rotary saws 14 and 16 and downwardly. More specifically, the saw teeth are formed such that the cutting surfaces 66 define planes which are generally parallel to the axis of the central shafts 18 of the rotary saws and the cutting surfaces 66 are formed such that the radially outer portion, i.e. that portion intersecting the radially outer surface 58 of the blade, forms a cutting edge 68. The remainder of the cutting surface 66 slopes radially inwardly and rearwardly away from the direction of rotation of the saw and trails the radially outer cutting edge 68. The saw teeth 24 are formed in this manner to improve the effectiveness of the teeth in pulling the limbs downwardly between the saws.

Means are also provided for rotatably driving the saws 14 and 16. In the illustrated construction this means comprises a pair of hydraulic motors 70 and 72. The hydraulic motor 70 drives a shaft 74 having a pulley 76 mounted on its rearward end, the pulley 76 supporting a drive belt 78 in turn driving a driven pulley 80 and the central shaft 18 of the saw 14. Similarly, the hydraulic motor 72 drives a shaft 82 and a pulley 84 in turn driving a drive belt 86 and a driven pulley 88 attached to the end of the central shaft 18 of the other rotary saw 16. The hydraulic motors 70 and 72 are operable to drive the rotary saw 14 in a clockwise direction as viewed in FIG. 3 and the rotary saw 16 in a counterclockwise direction. Referring to FIG. 1, it should be noted that the cutting surfaces 66 of the rotary saws thus pull the limbs of the trees toward a position between the rotary saws and will then pull the limbs downwardly between the saws.

It should also be noted that the saw blade 20 of the rotary saw 14 is wound around the central shaft 18 in a clockwise direction. Similarly the saw blade 22 of the other rotary saw 16 is wound about its central shaft 18 in a counterclockwise direction.

As illustrated in FIG. 2, the sub-frame 52 supporting the rotary saws 14 and 16 is pivotably attached to the frame 12 for pivotal movement about a pivot shaft 90 adjacent a rearward portion of the subframe 52. Means are also provided for effecting limited pivotal movement of the sub-frame 52 and the rotary saws about the axis of the horizontal pivot shaft 90 such that the forward ends of the rotary saws 14 and 16 move vertically. This means is provided in order to permit control of the alignment of the rotary saws with a tree being delimbed. In the illustrated construction, the means for effecting pivotal movement of the rotary saws 14 and 16 includes a hydraulic cylinder 92 having a lower end supported by the frame 12 and an upper end pivotally connected to the sub-frame 52 at a point adjacent the forward end of the rotary saws 14 and 16.

While the saws 14 and 16 are illustrated as being positioned below the trees for supporting the trees, in other embodiments other means could be provided to support the trees and the saws could be mounted in other positions, for example, they could be positioned above the tree and lowered into engagement with the tree.

As previously stated, the drive rollers 26 and 28 are supported for movement between a position wherein the rollers are spaced apart wherein a tree can be placed between the rollers and a second position wherein the rollers clampingly engage the tree wherein the tree can be pulled through the delimber machine. In the illustrated construction, the roller 26 is supported by a rigid frame member or post 94 which extends upwardly and rearwardly from the frame 12. The frame member 94 supports upper and lower rigid flanges 96 and 98 which in turn support the upper and lower ends of a pivot shaft 100. The pivot shaft 100 includes upper and lower ends which support a pair of arms 102 and 104 in turn rotatably supporting the upper and lower ends of the roller 26. The roller 28 is similarly supported by a frame member or post 106 which is rigid and which extends upwardly and forwardly from the frame 12. The frame member 106 includes a pair of flanges 108 and 110 which extend upwardly and which support the respective upper and lower ends of a pivot shaft 112. The pivot shaft 112 in turn supports a pair of roller support arms 114 and 116, and the roller support arms include ends which support the opposite ends of the roller 28.

Means are also provided for moving the rollers 26 and 28 between the position where they are spaced apart and the position where they can clampingly engage a tree therebetween. In the illustrated arrangement, this means comprises the hydraulic cylinder 32 having one end which is supported by a rearwardly extending support arm 120 rigidly joined to the support member 94. The opposite end of the cylinder 32 is pivotally connected to the roller support arm 102 at a point intermediate its opposite ends. Extension of the hydraulic cylinder will effect movement of the roller 26 about the pivot shaft 100 and between the position spaced from the tree to a position wherein the roller 26 clampingly engages the tree being fed through the delimbing machine. Similarly, the second hydraulic cylinder 34 is supported by a support arm 122 fixed to the support member 106. An opposite end of the cylinder 34 is pivotally connected to the roller support arm 114 at a point intermediate its opposite ends and is effective to cause movement of the roller 28 into clamping engagement with a tree being fed through the delimber machine.

Means are also provided for rotatably driving the cylinders 26 and 28 such that they will pull a tree through the delimbing machine. While various arrangements can be provided for rotatably driving the rollers, in the illustrated construction, the driving means includes the hydraulic motors 30 supported by the roller support arms 102 and 114. The rollers 26 and 28 are driven by the hydraulic motors 30 in opposite directions and in such a manner that they will cause a tree clampingly engaged therebetween to be pulled rearwardly over the rotary saws and to be forced toward the bin 40.

In the illustrated construction, the roller 26 is supported such that its axis is inclined rearwardly at an angle of approximately 27° with respect to a vertical axis. The other roller 28 is supported such that its axis is inclined forwardly at an angle of 27° with respect to a vertical axis. It will be appreciated by those skilled in the art that this relative angle between the rollers causes the tree to be rotated about its longitudinal axis as the tree is pulled over the saws.

While the support members 94 and 106 have been described as being fixedly attached to the frame 12, in other embodiments of the invention, the support members 94 and 106 could be supported for pivotal forward and rearward movement such that the relative angle between the rollers 26 and 28 could be increased or decreased. If the angle between the rollers 26 and 28 is decreased, the rollers will feed the tree linearly at a faster rate, but a decrease in the relative angle between the rollers will also decrease the amount of rotation of the tree with respect to its rate of linear movement. Increasing the relative angle between the rollers will increase the amount of rotation of the tree and decrease its rate of feed. If means are provided for varying the relative angle of the rollers, it would be possible to increase the rate of feed when smaller trees are being delimbed and less rotation is required, and conversely to increase the angle between the rollers and thereby increase the amount of rotation of the trees when larger trees are being fed through the delimbing machine.

While, in the illustrated construction, both of the rollers are driven, in other constructions, only one of the rollers might be driven. Additionally, it is also possible to place more than one driven roller on one side of the tree and an idler roller on an opposite side of the tree.

In the illustrated construction the means for feeding trees to the delimbing machine comprises a conveyor 38 adapted to support the butt end of the trees and to feed the butt end of the trees toward the rollers 26 and 28. In the construction illustrated in FIGS. 1 and 3, the feed means 38 includes a conveyor chain 130 comprised of large chain links and wherein the butt end of the tree is to be positioned on the conveyor chain. Means are also provided for selectively driving the chain when it is desired to feed another tree to the rotary saws. When the driving means is activated, the upper flight of the conveyor chain 130 travels toward the rollers 26 and 28, the chain being driven by a sprocket which also drives a radially extending feed arm 132 in a clockwise direction as seen in FIG. 3. As the chain moves the butt end of the tree toward the sprocket, rotation of the feed arm 132 (FIG. 3) will cause the feed arm to engage the butt end of the tree and to lift the tree off of the conveyor 38 and to drop it between the feed rollers 26 and 28. The hydraulic cylinders 32 and 34 of the rollers can then be actuated to clampingly engage the tree whereby the tree can be pulled into the delimbing machine. In other embodiments of the invention, a conventional boom loader could be employed to pick up a tree and to place the butt end of the tree between the rollers and centrally between the rotary saws.

In the illustrated construction, the rollers 26 and 28 drive the delimbed tree into an elongated generally concave bin 40. As shown in FIG. 4 the bin 40 is supported by a frame 134 in such a manner as to be pivotable about a pivot shaft 136. A hydraulic cylinder 138 having a lower end attached to the frame 134 and an upper end pivotally connected to the bin 40 is provided to cause selective pivotal movement of the elongated bin 40 from the solid line position in FIG. 4 to the dashed line position. The hydraulic cylinder 138 is thus functional to cause the delimbed logs contained in the bin 40 to be dumped into a receiving station where they can be processed or removed to a secondary processing area. It should also be understood that in the event that the delimbing machine is provided with a boom type loader for feeding trees to the delimbing machine, the boom type loader could be used to remove the delimbed logs from the bin, and the apparatus for pivoting the bin could be deleted.

As previously stated, one of the features of the invention is that the limbs removed from the trees and other waste material such as bark and the like is pulled downwardly between the rotary saws 14 and 16. In the illustrated construction the conveyor 50 is located beneath the rotary saws 14 and 16 for receiving this waste material and for conveying it to a point of further processing. For example, the conveyor could be adapted to feed the waste material to a chipper or chopping apparatus (not shown) adapted to chop the limbs and waste products into a form for use as fuel or for use as wood chips.

In other embodiments of the invention, the teeth 24 of the saw blades can be formed so that the points of the teeth extend somewhat radially outwardly. With the teeth in this configuration, the saw blades will function to remove bark as well as the limbs from the trees being delimbed.

Various features of the invention are set forth in the following claims.

I claim:

1. A machine for removing limbs from trees, the machine comprising a frame, a saw supported by the frame for rotation about a longitudinal axis, said saw having a forward end and a rearward end, and including a helical blade surrounding said axis, said blade being spaced radially outwardly from said axis and having a radially outer surface, a radially inner surface and a rearward edge, said rearward edge of said saw including saw teeth projecting rearwardly, said saw teeth each including a cutting edge defining a line being generally parallel to said longitudinal axis, and said saw being adapted to engage a tree with the tree being generally parallel to the longitudinal axis of the saw, means for causing rotation of the saw about its axis whereby said cutting edge of each of said saw teeth will engage the limbs of the tree to cut said limbs, and means adjacent said forward end of said saw for clampingly engaging a tree, for pulling the tree in the direction of said longitudinal axis of the saw, and for rotating the tree as it is pulled along the saw, said means for pulling and rotating including a pair of rollers adapted to clampingly engage the tree, means for moving one of the rollers toward the other roller and into clamping engagement with the tree, and means for causing rotation of one of the rollers.

2. The machine as set forth in claim 1 and wherein said saw includes teeth which extend in a direction opposite to the direction of movement of the tree over the saw, and wherein the means for rotating causes rotation of the saw in the same rotational direction as the direction of helical wrap of the blade around the longitudinal axis of the saw.

3. A machine as set forth in claim 1 wherein said saw includes teeth each having a cutting surface extending generally parallel to said longitudinal axis and wherein said teeth project in a direction opposite to the direction of movement of the tree over the saw.

4. A machine as set forth in claim 1 wherein said saw has a length substantially less than the length of the trees to be delimbed, and further including means for supporting said saw for pivotal movement about a horizontal axis adjacent said forward end of said saw.

5. A machine as set forth in claim 1 wherein one of said rollers extends upwardly and rearwardly with respect to the direction of movement of the tree through the delimbing machine and is rotatable about an axis lying in a first vertical plate and the other of said rollers extends upwardly and forwardly with respect to the direction of movement of said delimber machine, and is rotatable about an axis lying in a second vertical plane.

6. A machine as set forth in claim 1 wherein the means for clamping and rotating further includes means for supporting the first roller for pivotal movement about an axis parallel to the axis of rotation of said roller, and wherein said means for moving said one of said rollers toward the other of said rollers includes a hydraulic cylinder having one end supported by said frame and an opposite end connected to said one of said rollers.

7. A machine for removing limbs from trees, the machine comprising a frame, a saw supported by the frame for rotation about a longitudinal axis, said saw having a forward end and a rearward end, and including a helical blade surrounding said axis, said blade having a radially outer surface, a radially inner surface and a rearward edge, said rearward edge of said saw including saw teeth projecting rearwardly, said saw teeth each including a cutting edge defining a line being generally parallel to said longitudinal axis, and said saw being adapted to support a tree thereon with the tree being generally parallel to the longitudinal axis of the saw, and said saw having a length substantially less than the length of the trees to be delimbed, means for causing rotation of the saw about its axis whereby the cutting edges of said saw teeth will engage the limbs of the tree, and means for clampingly engaging a tree, for pulling the tree in the direction of said longitudinal axis over the saw, and for rotating the tree as it is pulled over the saw, said means for pulling and rotating including a pair of rollers adapted to clampingly engage the tree, means for moving one of the rollers toward the other roller and into clamping engagement with the tree, said means for moving including a hydraulic cylinder supported by said frame and having one end connected to said one of said rollers, and means for causing rotation of at least one of the rollers.

8. A machine for removing limbs from trees, the machine comprising a frame, a pair of saws supported by the frame, the saws each having a longitudinal axis and being supported by said frame for rotation about said longitudinal axis, and each of said saws having forward and rearward ends and a blade including a rearward edge and being helically wrapped around said longitudinal axis, said rearward edge of said saw including saw teeth projecting rearwardly, said saw teeth each including a cutting edge defining a line being generally parallel to said longitudinal axis, said saws being supported in parallel side-by-side relation and being adapted to support a tree thereon with the tree disposed between the saws and with the tree being generally parallel to the longitudinal axes of the saws, and said saws having a length substantially less than the length of the trees to be delimbed, means for causing rotation of the saws about their axes and toward each other, and means for clampingly engaging a tree, for pulling the tree in the direction of said longitudinal axes over the saws, and for rotating the tree as it is pulled over the saws, said means for pulling and rotating including a pair of rollers adapted to clampingly engage the tree, means for moving the rollers into clamping engagement with the tree, and means for causing rotation of at least one of the rollers.

9. A machine as set forth in claim 8 wherein each of said saws includes an elongated central shaft, and wherein said blades are spaced radially outwardly from the respective central shafts and are rigidly supported by the respective central shafts and wherein said blades of said saws include radial outer surfaces for supporting the tree, the tree being supported generally between and above said central shafts.

10. A machine as set forth in claim 8 wherein the direction of wrap of one of said helical blades about the central support of that saw is opposite to the direction of wrap of the helical blade of the other of said pair of saws.

11. A machine as set forth in claim 8 wherein one of said rollers extends upwardly and rearwardly with respect to the direction of movement of the tree and the other of said rollers extends upwardly and forwardly with respect to the direction of movement of the tree.

12. A machine as set forth in claim 8 wherein the means of clamping and rotating further includes means for supporting the first roller for pivotal movement about an axis parallel to the axis of rotation of said roller, and means for moving said one of said rollers into engagement with the other of said rollers, said means for moving including a hydraulic cylinder having one end supported by said frame and an opposite end connected to said roller.

13. A machine for removing limbs from trees, the machine comprising a frame, a saw supported by the frame for rotation about a longitudinal axis and including a helical blade surrounding said axis, said saw having a forward and rearward end, and said blade having a radially outer surface, a radially inner surface and a rearward edge, said rearward edge of said saw including saw teeth projecting rearwardly, said saw teeth each including a cutting edge defining a line being generally parallel to said longitudinal axis, and said saw being adapted to engage a tree with the tree being generally parallel to the longitudinal axis of the saw, means for causing rotation of the saw about its axis whereby the cutting edges of said saw teeth will engage the limbs of the tree to cut said limbs, and means for clampingly engaging a tree, for pulling the tree in the direction of said longitudinal axis of the saw, and for rotating the tree as it is pulled along the saw.

14. A machine for removing limbs from trees, the machine comprising a frame, a pair of saws supported by the frame, the saws each having a longitudinal axis and being supported by said frame for rotation about said longitudinal axis, and each of said saws having forward and rearward ends and a blade including a rearward edge and being helically wrapped around said longitudinal axis, said rearward edge of said saw including saw teeth projecting rearwardly, said saw teeth each including a cutting edge defining a line generally parallel to said longitudinal axis, said saws being supported in parallel side-by-side relation and being adapted to support a tree thereon with the tree disposed between the saws and with the tree being generally parallel to the longitudinal axes of the saws, and said saws having a length substantially less than the length of the trees to be delimbed, means for causing rotation of the saws about their axes and toward each other, and means for clampingly engaging a tree, for pulling the tree in the direction of said longitudinal axes over the saws, and for rotating the tree as it is pulled over the saws.

15. A machine as set forth in claim 14 wherein each of said saws includes an elongated central shaft, and wherein said blades are spaced radially outwardly from the respective central shafts and are rigidly supported by the respective central shafts and wherein said blades of said saws include radial outer surfaces for supporting the tree, the tree being supported generally between and above said central shafts.

* * * * *